US009596689B2

United States Patent
Cai et al.

(10) Patent No.: US 9,596,689 B2
(45) Date of Patent: Mar. 14, 2017

(54) RADIO RESOURCE ALLOCATION FOR D2D COMMUNICATIONS

(71) Applicant: Alcatel-Lucent USA Inc., Murray Hill, NJ (US)

(72) Inventors: Yigang Cai, Naperville, IL (US); Anil Rao, Redmond, WA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 101 days.

(21) Appl. No.: 14/575,667

(22) Filed: Dec. 18, 2014

(65) Prior Publication Data
US 2016/0183237 A1 Jun. 23, 2016

(51) Int. Cl.
*H04W 72/04* (2009.01)
*H04W 72/12* (2009.01)

(52) U.S. Cl.
CPC ...... *H04W 72/048* (2013.01); *H04W 72/1226* (2013.01)

(58) Field of Classification Search
CPC ............... H04W 72/048; H04W 72/04; H04W 72/0406; H04W 72/0413; H04W 72/042
USPC ....... 370/310, 328, 329, 351, 389, 427, 431, 370/432; 455/403, 422.1, 450, 452.1, 455/456.1, 462, 464, 39, 500, 507, 509
See application file for complete search history.

(56) References Cited

U.S. PATENT DOCUMENTS

2015/0215981 A1* 7/2015 Patil .................... H04W 76/023 370/329

2015/0264677 A1* 9/2015 He ........................ H04W 72/02 370/312

OTHER PUBLICATIONS

D2D coverage definition, 3GPP TSG-RAN WG1 Meeting #77,R1-142190, May 2014, Seoul Korea.
D2D Network Coverage Definition & Mode Selection, 3GPP TSG RAN WG1 Meeting #77, R1-142208, May 2014, Seoul, Korea.
Definition of coverage zones for D2D communication, 3GPP TSG RAN WG1 Meeting #77, R1-142543, May 2014, Seoul, Korea.
Definition of in-coverage, out-of-coverage, and edge-of-cell coverage, 3GPP TSG RAN WG1 Meeting #77, R1-142058, May 2014, Seoul, Korea.
Definition of in-coverage, out-of-coverage, and edge-of-cell coverage, 3GPP TSG RAN WG1 Meeting #78 ,R1-143022, Aug. 2014, Dresden, Germany.

(Continued)

*Primary Examiner* — Obaidul Huq
(74) *Attorney, Agent, or Firm* — Duft Bornsen & Fettig, LLP (57) ABSTRACT

Systems and methods for switching radio resource allocation for User Equipment (UE) enabled for a device-to-device (D2D) communication. One embodiment is a base station that switches resource allocation between Mode 1, Mode 2, and a transition mode. For the transition mode, one or more parameters have a value in a range between a value specified in Mode 1 and a value specified in Mode 2 for the parameter (s). The base station detects movement of the UE from in-coverage of the base station to edge-of-coverage, and initiates switching of the resource allocation for the UE from Mode 1 to the transition mode. The base station then detects movement of the UE from edge-of-coverage of the base station to out-of-coverage, and initiates switching of the radio resource allocation for the UE from the transition mode to Mode 2.

17 Claims, 6 Drawing Sheets

(56) References Cited

OTHER PUBLICATIONS

Definitions of in-coverage, out-of-coverage, edge-of-cell coverage, 3GPP TSG RAN WG1 #77, R1-142114, May 2014, Seoul, South Korea.
On D2D Resource Allocation Modes and In/Edge/Out of Coverage Definition, 3GPP TSG RAN WG1 Meeting #77, R1-142018, May 2014, Seoul, Korea.
On Metric and Procedures for In/Out of NW Coverage detection for D2D, 3GPP TSG-RAN WG1 #77, R1-142404, May 2014, Seoul Republic of Korea.
PD2DSCH Design, 3GPP TSG RAN WG1 Meeting #78, R1-143025, Aug. 2014, Dresden, Germany.
ProSe device-to-device coverage definitions, 3GPP TSG-RAN1#77, R1-142531, May 2014, Seoul Korea.
Relationship between coverage conditions and D2D operation, 3GPP TSG RAN WG1 Meeting #77, R1-142451, May 2014, Seoul, South Korea.
Resource allocation mode decision at D2D UE under eNB controllability, 3GPP TSG RAN WG1 Meeting #77, R1-142154, May 2014, Seoul, Korea.
3rd Generation Partnership Project, Proximity-based Services, 3GPP TS 23.303, Version 12.0.0 (Feb. 2014).
3rd Generation Partnership Project, Study on LTE Device to Device Proximity Services, 3GPP TR 36.843, Version 12.0.1 (Mar. 2014).
3rd Generation Partnership Project, Feasibility Study for Proximity Services (ProSe), 3GPP TR 22.803, Version 12.2.0 (Jun. 2013).

* cited by examiner

FIG. 1

USER DATA PLANE
CONTROL PLANE

FIG. 7

RADIO RESOURCE ALLOCATION FOR D2D COMMUNICATIONS

FIELD OF THE INVENTION

The invention is related to the field of communication systems and, in particular, to proximity services.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the radio resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery, direct communication, and UE-to-network relay. Direct discovery is a function where a UE identifies other UEs that are in proximity Direct communication is a function where UEs in proximity are able to communicate using local radio resources. UE-to-network relay is a function where a UE can relay traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

SUMMARY

Embodiments described herein provide radio resource allocation for D2D communications. For a UE to transmit direct data or direct control information to one or more other UEs, two modes of radio resource allocation have been defined by the 3GPP (i.e., Mode 1 and Mode 2). For Mode 1, the eNodeB specifies the radio resources to be used by the transmitting UE for the D2D transmission. For Mode 2, the transmitting UE selects resources from a resource pool to be used for the D2D transmission. The resources available to the transmitting UE may be different between the two modes. For example, the transmission bandwidth specified for Mode 1 may be much higher than the transmission bandwidth specified for Mode 2. As a UE moves towards the edge of a cell, the UE may transition from Mode 1 to Mode 2, or vice-versa, depending on whether the UE is moving into the cell or out of the cell. There may be problems associated with transitioning between modes in this manner, especially when the parameters specified in each mode vary by a large amount.

To solve this problem, a transition mode is defined herein for radio resource allocation when a UE is moving toward the edge of a cell. The transition mode represents an intermediate stage between Mode 1 and Mode 2. To act as an intermediate stage, one or more parameters specified for the transition mode will have a value somewhere between the values specified for Mode 1 and Mode 2 for the same parameter. For example, if the transmission bandwidth defined for Mode 1 is 50 Resource Blocks (RB) and the transmission bandwidth defined for Mode 2 is 2 RBs, then the transmission bandwidth defined for the transition mode may be 25 RBs. Because the value for one or more parameters of the transition mode is set between the values specified for the same parameter(s) of Mode 1 and Mode 2, there will be less drastic changes in radio resources when a UE moves in or out of a cell. This advantageously allows for a smoother transition between Mode 1 and Mode 2, and potentially avoids interruption of a D2D communication.

One embodiment comprises a base station of a radio access network. The base station includes a controller configured to switch radio resource allocation for a UE that is enabled for D2D communication between Mode 1, Mode 2, and a transition mode. For the transition mode, a parameter (or multiple parameters) has a value in a range between a first value specified in Mode 1 and a second value specified in Mode 2 for the parameter. The base station further includes a controller is configured to detect a first movement of the UE from in-coverage of the base station to edge-of-coverage of the base station, and to initiate switching of the radio resource allocation for the UE from Mode 1 to the transition mode in response to the first movement of the UE. The controller is configured to detect a second movement of the UE from edge-of-coverage of the base station to out-of-coverage of the base station, and to initiate switching of the radio resource allocation for the UE from the transition mode to Mode 2 in response to the second movement of the UE.

In another embodiment, the controller is configured to detect a third movement of the UE from out-of-coverage of the base station to edge-of-coverage of the base station, and to initiate switching of the radio resource allocation for the UE from Mode 2 to the transition mode in response to the third movement of the UE. The controller is configured to detect a fourth movement of the UE from edge-of-coverage of the base station to in-coverage of the base station, and to initiate switching of the radio resource allocation for the UE from the transition mode to Mode 1 in response to the fourth movement of the UE.

In another embodiment, the base station comprises an eNodeB of an evolved UMTS Terrestrial Radio Access Network (e-UTRAN).

In another embodiment, the controller is configured to pre-provision the UE with a resource pool that specifies parameters for Mode 2.

In another embodiment, the controller is configured to pre-provision the UE with a resource pool that specifies the at least one parameter for the transition mode.

Another embodiment comprises a method of switching radio resource allocation for a UE that is enabled for D2D communication. The method includes detecting (by a base station) a first movement of the UE from in-coverage of the base station to edge-of-coverage of the base station, and switching the radio resource allocation for the UE from Mode 1 to the transition mode in response to the first movement of the UE. The method further includes detecting a second movement of the UE from edge-of-coverage of the base station to out-of-coverage of the base station, and switching the radio resource allocation for the UE from the transition mode to Mode 2 in response to the second movement of the UE.

In another embodiment, the method further includes detecting a third movement of the UE from out-of-coverage of the base station to edge-of-coverage of the base station, and switching the radio resource allocation for the UE from Mode 2 to the transition mode in response to the third movement of the UE. The method further includes detecting a fourth movement of the UE from edge-of-coverage of the base station to in-coverage of the base station, and switching the radio resource allocation for the UE from the transition mode to Mode 1 in response to the fourth movement of the UE.

In another embodiment, the method further includes pre-provisioning the UE with a resource pool that specifies parameters for Mode 2.

In another embodiment, the method further includes pre-provisioning the UE with a resource pool that specifies the at least one parameter for the transition mode.

Another embodiment includes a UE enabled for a D2D communication. The UE includes a radio interface configured to exchange radio signals for the D2D communication. The UE further includes a controller configured to switch radio resource allocation for the radio interface between Mode 1, Mode 2, and the transition mode based on movement of the UE in relation to a cell of a radio access network.

In another embodiment, the controller is configured to detect a first movement of the UE from in-coverage of the cell to edge-of-coverage of the cell, and to initiate switching of the radio resource allocation for the radio interface from Mode 1 to the transition mode in response to the first movement of the UE. The controller is configured to detect a second movement of the UE from edge-of-coverage of the cell to out-of-coverage of the cell, and to initiate switching of the radio resource allocation for the radio interface from the transition mode to Mode 2 in response to the second movement of the UE.

In another embodiment, the controller is configured to detect a first movement of the UE from out-of-coverage of the cell to edge-of-coverage of the cell, and to initiate switching of the radio resource allocation for the radio interface from Mode 2 to the transition mode in response to the first movement of the UE. The controller is configured to detect a second movement of the UE from edge-of-coverage of the cell to in-coverage of the cell, and to initiate switching of the radio resource allocation for the radio interface from the transition mode to Mode 1 in response to the second movement of the UE.

In another embodiment, the controller is pre-provisioned with a resource pool that specifies parameters for Mode 2.

In another embodiment, the controller is pre-provisioned with a resource pool that specifies the at least one parameter for the transition mode.

In another embodiment, the cell includes a base station, and the controller is configured to receive the resource pool for the transition mode from the base station.

In another embodiment, the controller is configured to receive the resource pool for the transition mode from a relay node.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

The embodiments described below relate to proximity services. Proximity services are services provided between devices (i.e., User Equipment (UE)) being in proximity to each other. Proximity services utilize the radio technologies of the UEs without going through the core network. For example, if two UEs are close enough together, they may exchange communications directly with one another. One example of proximity services is the Proximity Service (ProSe) defined by the 3GPP, such as in 3GPP TS 23.303 (v12.0.0), which is incorporated by reference as if fully included herein.

Proximity services include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery is referred to as EPC-level discovery, which is a process by which an Evolved Packet Core (EPC) network determines the proximity of two UEs and informs them of their proximity. For example, a server in an EPC network may monitor the location of UEs, and inform the UEs of their proximity.

Direct communication is a communication between two or more UEs in proximity by means of user data plane transmission using radio technology (e.g., E-UTRA) via a channel not traversing any network node (other than possibly a base station of a RAN). Direct communication allows the UEs to use local radio resources to communicate directly with each other without routing traffic through a core network, such as an EPC network. For example, UEs may directly communicate through the radio resources available to both UEs from a RAN, such as from a base station. UEs may also directly communicate through the radio resources of the UEs themselves, such as over the PC5 reference point. Either way, the traffic exchanged between the UEs is not routed through the core network, but is routed directly between the UEs over a wireless interface.

Figure 1:
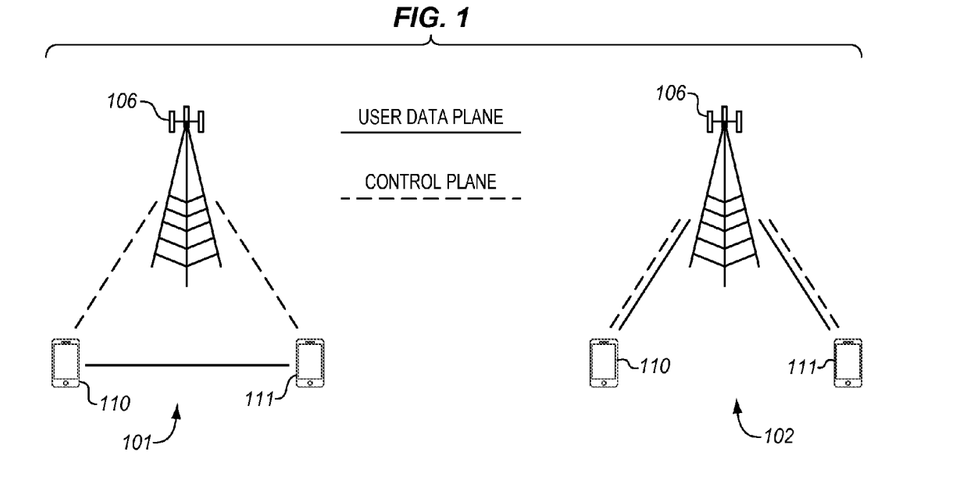
FIG. 1 illustrates direct communication scenarios between two UEs.

FIG. 1 illustrates direct communication scenarios between two UEs. In scenario 101, a base station 106 is in communication with UEs 110-111. Base station 106 communicates with UEs 110-111 over the control plane (also referred to as control path or control channel) to exchange signaling messages and other types of control messages with UEs 110-111. UEs 110-111 are able to establish a direct communication over a user data plane (also referred to as a data path or data channel) using local radio resources to communicate directly with each other without routing traffic through a core network. In scenario 102, base station 106 again communicates with UEs 110-111 over the control plane to exchange signaling messages and other types of control messages with UEs 110-111. UEs 110-111 are able to establish a direct communication over the user data plane through base station 106 without routing traffic through a core network. In each of the above scenarios, UEs 110-111 establish a direct communication between each other, which is also referred to herein as a D2D communication.

Radio resource allocation is one aspect of D2D communication. Radio resources are the local radio resources of a UE that is used to transmit data or control information for the D2D communication over the user data plane. Some examples of radio resources are transmission bandwidth, packet size, modulation, coding, number of spatial layers, number of reference symbols, transmission (Tx) power, frequency diversity, time diversity, spatial diversity, number of cells, Reference Signal Received Power (RSRP) threshold, etc. Radio resources such as these are allocated to a UE for D2D communications. According to the 3GPP, a transmitting UE can operate in two modes for resource allocation. The first mode is referred to as "Mode 1", where an eNodeB or a relay node schedules the exact resources used by a UE to transmit direct data and direct control information. The second mode is referred to as "Mode 2", where a UE selects its own resources from resource pools to transmit direct data and direct control information. For example, when a transmitting UE is within the coverage area of an eNodeB, the eNodeB can schedule the radio resources to be used by the UE in a D2D communication. When a transmitting UE is outside the coverage area of any eNodeB of a RAN, the UE looks to a pre-provisioned resource pool to schedule the radio resources to be used in a D2D communication.

Figure 2:
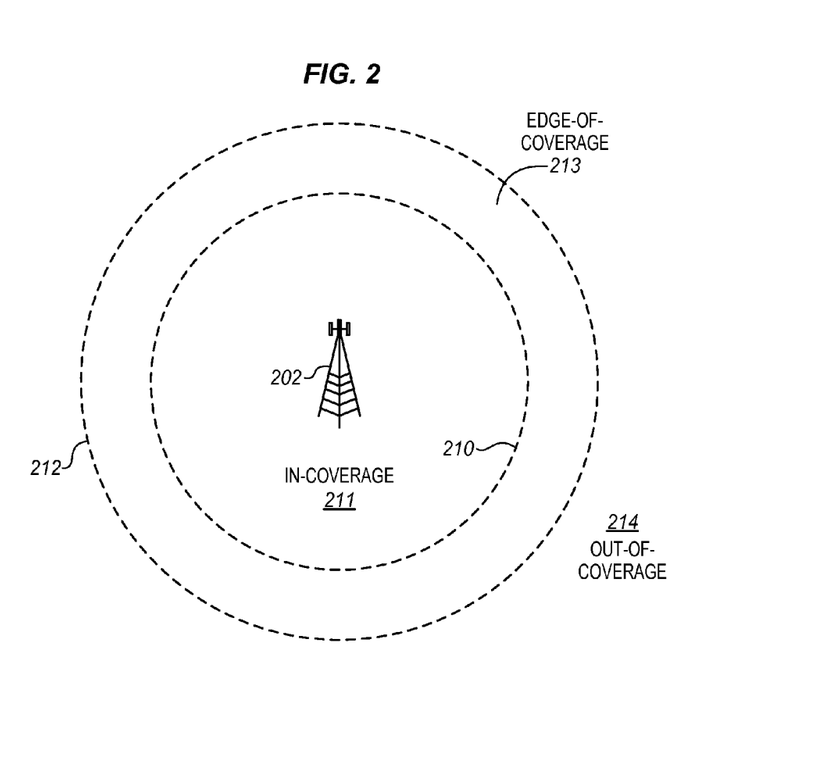
FIG. 2 illustrates the coverage scenarios for a UE.

The 3GPP also discusses three types of coverage based on the location of a UE in relation to a cell (or base station), which are in-coverage, edge-of-coverage, and out-of-coverage. FIG. 2 illustrates the coverage scenarios for a UE. A base station 202 in FIG. 2 has a coverage area (or service area) representing a cell. The area 211 within circle 210 represents the in-coverage area of base station 202. The in-coverage area refers, for example, to the coverage area of base station 202 where the received power (e.g., downlink) for a UE exceeds a threshold. The area 213 within circle 212 and outside of circle 210 represents the edge-of-coverage area of base station 202. The edge-of-coverage area refers, for example, to the area where a UE can still exchange signals with base station 202, but the received power (e.g., downlink) is below a threshold. In other words, a UE may be in range of base station 202, but the signal quality is below an acceptable level. The area 214 outside of circle 212 represents the out-of-coverage area of base station 202. In the out-of-coverage area, the UE is unable to communicate with base station 202.

The 3GPP specifies that a UE that is in-coverage shall support Mode 1 resource allocation for D2D communications. The 3GPP also specifies that a UE that is edge-of-coverage or out-of-coverage shall support Mode 2 resource allocation for D2D communications. Therefore, if a UE moves from in-coverage to out-of-coverage, or vice-versa, the UE may have to switch between Mode 1 and Mode 2 for resource allocation, which may be problematic. The radio resource allocation of Mode 2 is pre-provisioned by the network (eNodeB), while the radio resource allocation of Mode 1 is dynamically scheduled by the network. A hard mode switching between Mode 1 and Mode 2 may cause undesirably-drastic resource changes. As one example, the TCP layer reacts more favorably to slow changes in the data rate allocation. A drastic reduction in radio resources (and hence data rate) occurring suddenly can trigger a TCP congestion mode where data throughput at the TCP source can be reduced drastically. Another example is radio resource allocation for a bandwidth application. A hard mode switching may cause a high bandwidth application to change to a low bandwidth (or vice-versa) during a continuous D2D communication. In either of these scenarios, a D2D communication (e.g., ongoing) may be adversely affected by drastic changes in resource allocation within a UE.

To ensure a seamless transition during a D2D communication while a UE is moving in or out of a cell, a new mode of resource allocation is introduced in the present embodiments. The new mode of resource allocation is referred to as a "transition mode" or Mode T. The transition mode (Mode T) represents an intermediate step between Mode 1 and Mode 2 to smoothen a transition between Mode 1 and Mode 2, especially if there is a large difference in resource allocations specified between Mode 1 and Mode 2. Mode 1 and Mode 2 each specify parameters for resource allocation, and specify values associated with each parameter. Mode T also specifies one or more parameters for resource allocation. The parameters specified in Mode T may be the same as the parameters specified in Mode 1 and Mode 2, or may be a subset of the parameters for these modes. The value of a parameter (or multiple parameters) specified in Mode T is in a range between the value in Mode 1 and the value of in Mode 2 for the parameter. For example, if Mode 1 specifies a transmission bandwidth parameter with a value of 50 (RB) and Mode 2 specifies a transmission bandwidth parameter with a value of 2 (RB), then the value of the transmission bandwidth in Mode T may be in a range between 2 and 50 (e.g., 3-49 RB). The value of the parameter(s) in Mode T is configurable, but should represent an intermediate value between the value specified in Mode 1 and the value specified in Mode 2 for the same parameter(s).

Figure 3:
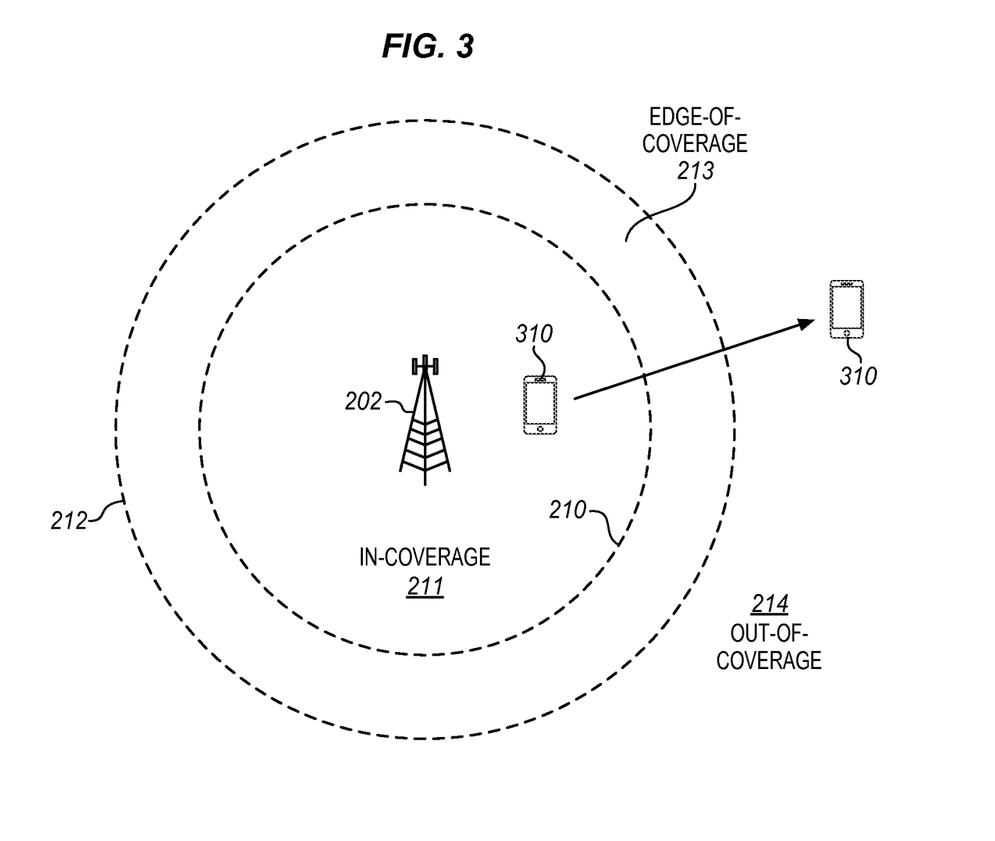
FIG. 3 illustrates a scenario where a UE is moving out of a cell in an exemplary embodiment.

When a UE is moving out of a cell or into a cell, resource allocation for D2D communications switches between Mode 1, Mode T, and Mode 2. FIG. 3 illustrates a scenario where a UE is moving out of a cell in an exemplary embodiment. The cell in FIG. 3 is provided by base station 202. Base station 202 comprises a physical tower in a radio access network, including one or more antennas and one or more controllers configured to provide a coverage area for radio signals. When UE 310 moves from in-coverage of the cell to out-of-coverage of the cell, radio resource allocation will transition from Mode 1 to Mode T, and then from Mode T to Mode 2, which is further discussed in FIG. 4.

Figure 4:
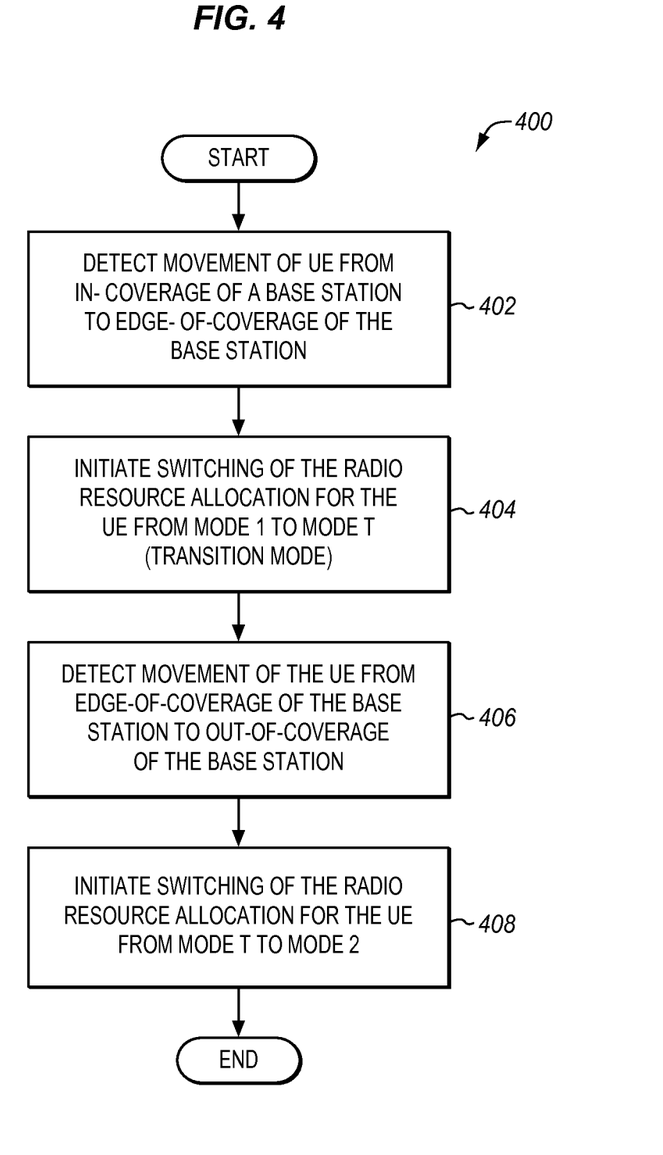
FIG. 4 is a flow chart illustrating a method for switching radio resource allocation in an exemplary embodiment.

FIG. 4 is a flow chart illustrating a method 400 for switching radio resource allocation in an exemplary embodiment. The steps of method 400 will be described with reference to base station 202 in FIG. 3, but those skilled in the art will appreciate that method 400 may be performed in other systems. Also, the steps of the flow charts described herein are not all inclusive and may include other steps not shown, and the steps may be performed in an alternative order.

It is assumed for this embodiment that base station 202 includes a controller (including a processor) that is configured to switch the radio resource allocation for UEs. The controller in base station 202 detects movement of UE 310 from in-coverage of base station 202 to edge-of-coverage of base station 202 (step 402). At this time, UE 310 may be engaged in a D2D communication. In response to the movement of UE 310, the controller initiates switching of the radio resource allocation for UE 310 from Mode 1 to Mode T (step 404). The controller of base station 202 may transmit any desired control signals to UE 310 in order to switch the radio resource allocation for UE 310. The controller then detects movement of UE 310 from edge-of-coverage of base station 202 to out-of-coverage of base station 202 (step 406). In response to the movement of UE 310, the controller initiates switching of the radio resource allocation for UE 310 from Mode T to Mode 2 (step 408).

Figure 5:
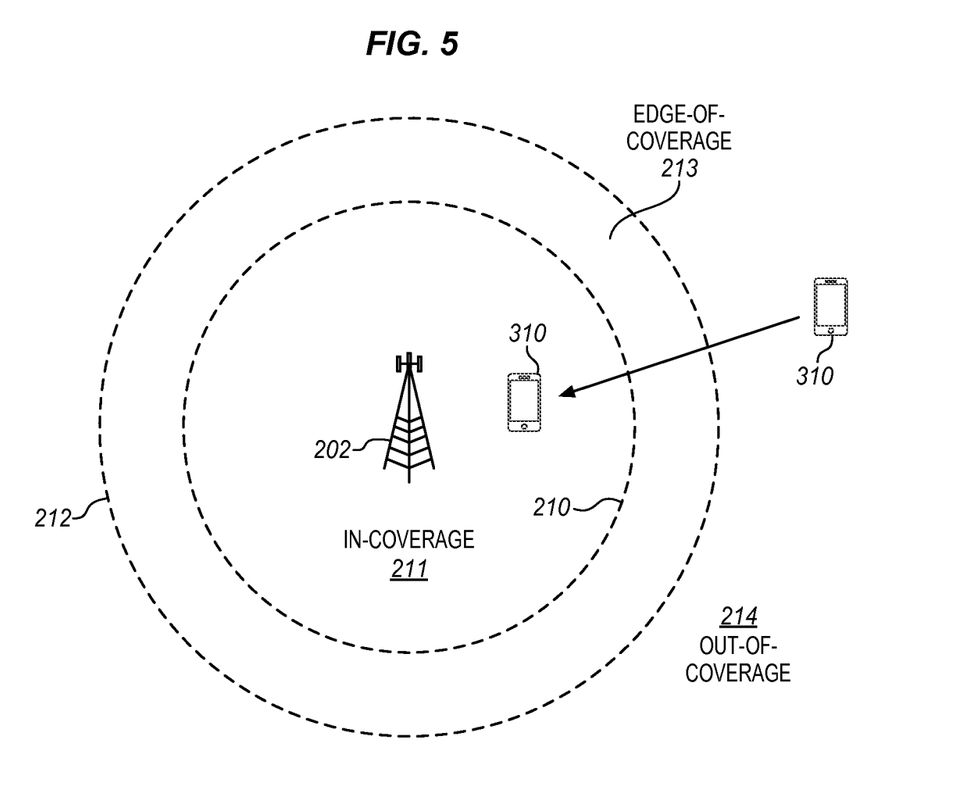
FIG. 5 illustrates a scenario where a UE is moving into a cell in an exemplary embodiment.

FIG. 5 illustrates a scenario where a UE is moving into a cell in an exemplary embodiment. When UE 310 moves from out-of-coverage of the cell to in-coverage of the cell, radio resource allocation will transition from Mode 2 to Mode T, and then from Mode T to Mode 1, which is further discussed in FIG. 6.

Figure 6:
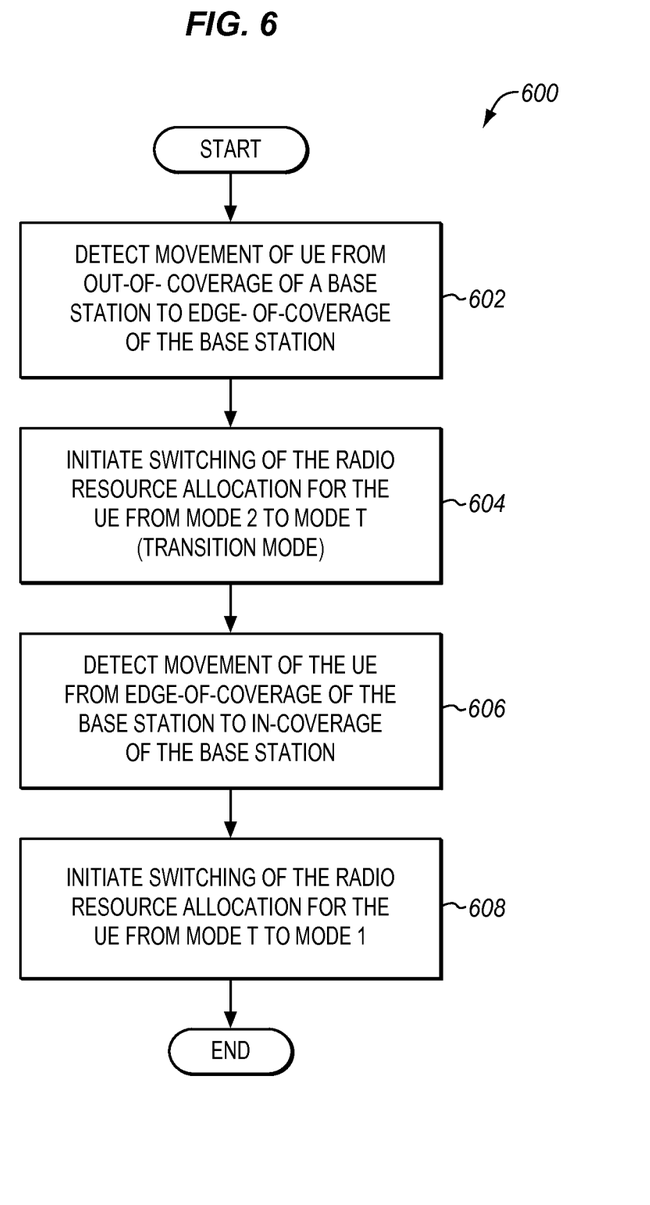
FIG. 6 is a flow chart illustrating a method for switching radio resource allocation in an exemplary embodiment.

FIG. 6 is a flow chart illustrating a method 600 for switching radio resource allocation in an exemplary embodiment. The steps of method 600 will be described with reference to base station 202 in FIG. 5, but those skilled in the art will appreciate that method 600 may be performed in other systems. Also, the steps of the flow charts described herein are not all inclusive and may include other steps not shown, and the steps may be performed in an alternative order.

A controller in base station 202 detects movement of UE 310 from out-of-coverage of base station 202 to edge-of-coverage of base station 202 (step 602). In response to the movement of UE 310, the controller initiates switching of the radio resource allocation for UE 310 from Mode 2 to Mode T (step 604). The controller then detects movement of UE 310 from edge-of-coverage of base station 202 to in-coverage of base station 202 (step 606). In response to the movement of UE 310, the controller initiates switching of the radio resource allocation for UE 310 from Mode T to Mode 1 (step 608).

The transition mode (Mode T) may be different depending on the direction of movement of the UE. If UE is moving into a cell (i.e., from out-of-coverage, to edge-of-coverage, to in-coverage), then the values of the parameters may be different than if the UE is moving out of a cell. Also, the thresholds used to define edge-of-coverage may also vary based on the direction of movement of the UE.

Figure 7:
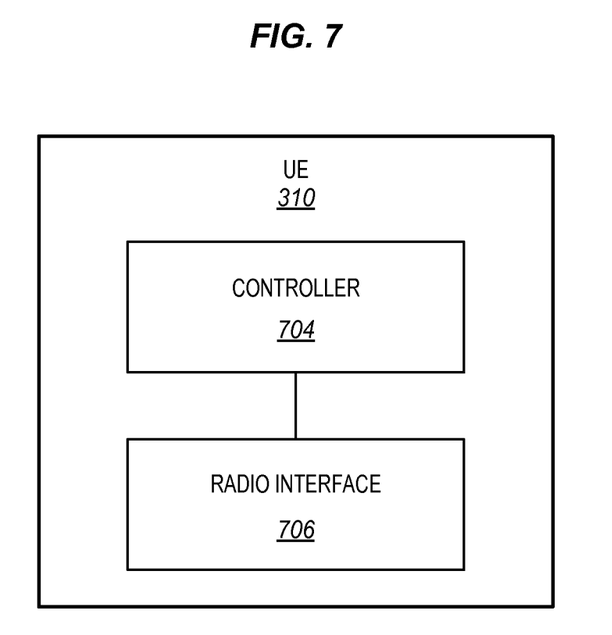
FIG. 7 illustrates a UE that switches resource allocation for a D2D communication in an exemplary embodiment.

Methods 400 and 600 above were described as being performed in base station 202. These methods may additionally or alternatively be performed in the UE. FIG. 7 illustrates UE 310 that switches resource allocation for a D2D communication in an exemplary embodiment. UE 310 includes a controller 704 (including a processor) and a radio interface 706. Controller 704 is configured to switch between resource allocation modes depending on the location of UE 310 in relation to a cell. Radio interface 706 represents the local radio resources of UE 310, such as a transceiver and an antenna, used for wireless communications to exchange over-the-air signals. Any UE involved in a D2D communication may have a similar configuration as UE 310.

It is assumed for this embodiment that UE 310 is pre-provisioned with a resource pool for Mode 2. For instance, the controller in base station 202 may pre-provision UE 310 with the resource pool for Mode 2 when it is in range of base station 202. The controller in base station 202 may also pre-provision UE 310 with a resource pool for Mode T. The pre-provisioning of UE 310 may be performed by another base station or a relay node.

When UE 310 moves out of a cell, such as shown in FIG. 3, controller 704 detects movement of UE 310 from in-coverage of base station 202 to edge-of-coverage of base station 202 (step 402). In response to the movement of UE 310, controller 704 initiates switching of the radio resource allocation for UE 310 (i.e., the resource allocation for radio interface 706) from Mode 1 to Mode T (step 404). Controller 704 then detects movement of UE 310 from edge-of-coverage of base station 202 to out-of-coverage of base station 202 (step 406). In response to the movement of UE 310, controller 704 initiates switching of the radio resource allocation for UE 310 from Mode T to Mode 2 (step 408).

Switching of resource allocation may also be shared by UE 310 and base station 202. Base station 202 may control switching from Mode 1 to Mode T when UE 310 moves from in-coverage to edge-of-coverage. Base station 202 may also provide a resource pool for Mode 2 and Mode T to UE 310 while it is in-coverage. When UE 310 moves from edge-of-coverage to out-of-coverage, UE 310 may control switching from Mode T to Mode 2.

When UE 310 moves into a cell, such as shown in FIG. 5, controller 704 detects movement of UE 310 from out-of-coverage of base station 202 to edge-of-coverage of base station 202 (step 602). In response to the movement of UE 310, controller 704 initiates switching of the radio resource allocation for UE 310 from Mode 2 to Mode T (step 604). Controller 704 then detects movement of UE 310 from edge-of-coverage of base station 202 to in-coverage of base station 202 (step 606). In response to the movement of UE 310, controller 704 initiates switching of the radio resource allocation for UE 310 from Mode T to Mode 1 (step 608).

The above embodiments advantageously allow for a smoother transition of radio resources for a D2D communication. Because there may be a large difference in the radio resources scheduled for Mode 1 and Mode 2, the new transition mode (Mode T) acts as an intermediate step between Mode 1 and Mode 2. Instead of directly transitioning from Mode 1 to Mode 2 (or vice-versa), a UE transitions between Mode 1 and Mode 2 through Mode T to avoid drastic changes in radio resources during a D2D communication. Therefore, it is less likely that the D2D communication will be negatively affected by the transition.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
   a base station of a radio access network, the base station comprising:
      a processor configured to switch radio resource allocation for User Equipment (UE) that is enabled for device-to-device (D2D) communication between Mode 1, Mode 2, and a transition mode;
      wherein Mode 1, Mode 2, and the transition mode each specify parameters for allocating radio resources of the UE for D2D communication;
      wherein Mode 1 specifies first values for the parameters, Mode 2 specifies second values for the parameters, and the transition mode specifies third values for the parameters;
      wherein for at least one of the parameters, the transition mode specifies a third value in a range between a first value specified in Mode 1 and a second value specified in Mode 2 to smoothen a transition of the radio resource allocation for the UE between Mode 1 and Mode 2;
      the processor is configured to detect a first movement of the UE from in-coverage of the base station to edge-of-coverage of the base station, and to initiate switching of the radio resource allocation for the UE from Mode 1 to the transition mode in response to the first movement of the UE;
      the processor is configured to detect a second movement of the UE from edge-of-coverage of the base station to out-of-coverage of the base station, and to initiate switching of the radio resource allocation for the UE from the transition mode to Mode 2 in response to the second movement of the UE.

2. The apparatus of claim 1 wherein:
   the processor is configured to detect a third movement of the UE from out-of-coverage of the base station to edge-of-coverage of the base station, and to initiate switching of the radio resource allocation for the UE from Mode 2 to the transition mode in response to the third movement of the UE; and
   the processor is configured to detect a fourth movement of the UE from edge-of-coverage of the base station to in-coverage of the base station, and to initiate switching of the radio resource allocation for the UE from the transition mode to Mode 1 in response to the fourth movement of the UE.

3. The apparatus of claim 1 wherein:
   the base station comprises an eNodeB of an evolved UMTS Terrestrial Radio Access Network (e-UTRAN).

4. The apparatus of claim 1 wherein:
   the processor is configured to pre-provision the UE with a resource pool that specifies the parameters for Mode 2 for allocating the radio resources of the UE for D2D communication, and specifies the second values for the parameters.

5. The apparatus of claim 1 wherein:
   the processor is configured to pre-provision the UE with a resource pool that specifies the parameters for the transition mode for allocating the radio resources of the UE for the D2D communication, and specifies the third values for the parameters.

6. A method of switching radio resource allocation for User Equipment (UE) that is enabled for device-to-device (D2D) communication, the method comprising:
   detecting, by a base station of a radio access network, a first movement of the UE from in-coverage of the base station to edge-of-coverage of the base station;
   wherein the base station is configured to switch radio resource allocation for the UE between Mode 1, Mode 2, and a transition mode;
   wherein Mode 1, Mode 2, and the transition mode each specify parameters for allocating radio resources of the UE for D2D communication;
   wherein Mode 1 specifies first values for the parameters, Mode 2 specifies second values for the parameters, and the transition mode specifies third values for the parameters;
   wherein for at least one of the parameters, the transition mode specifies a third value in a range between a first value specified in Mode 1 and a second value specified in Mode 2 to smoothen a transition of the radio resource allocation for the UE between Mode 1 and Mode 2;
   switching the radio resource allocation for the UE from Mode 1 to the transition mode in response to the first movement of the UE;
   detecting, by the base station, a second movement of the UE from edge-of-coverage of the base station to out-of-coverage of the base station; and
   switching the radio resource allocation for the UE from the transition mode to Mode 2 in response to the second movement of the UE.

7. The method of claim 6 further comprising:
   detecting, by the base station, a third movement of the UE from out-of-coverage of the base station to edge-of-coverage of the base station;
   switching the radio resource allocation for the UE from Mode 2 to the transition mode in response to the third movement of the UE;

detecting, by the base station, a fourth movement of the UE from edge-of-coverage of the base station to in-coverage of the base station; and switching the radio resource allocation for the UE from the transition mode to Mode 1 in response to the fourth movement of the UE.

8. The method of claim 6 wherein:

the base station comprises an eNodeB of an evolved UMTS Terrestrial Radio Access Network (e-UTRAN).

9. The method of claim 6 further comprising:

pre-provisioning, by the base station, the UE with a resource pool that specifies the parameters for Mode 2 for allocating the radio resources of the UE for D2D communication, and specifies the second values for the parameters.

10. The method of claim 6 further comprising:

pre-provisioning, by the base station, the UE with a resource pool that specifies the parameters for the transition mode for allocating the radio resources of the UE for the D2D communication, and specifies the third values for the parameters.

11. An apparatus comprising:

User Equipment (UE) enabled for a device-to-device (D2D) communication, the UE comprising:

a radio interface configured to exchange radio signals for the D2D communication; and a processor configured to switch radio resource allocation for the radio interface between Mode 1, Mode 2, and a transition mode based on movement of the UE in relation to a cell of a radio access network;

wherein Mode 1, Mode 2, and the transition mode each specify parameters for allocating radio resources of the UE for D2D communication;

wherein Mode 1 specifies first values for the parameters, Mode 2 specifies second values for the parameters, and the transition mode specifies third values for the parameters;

wherein for at least one of the parameters, the transition mode specifies a third value in a range between a first value specified in Mode 1 and a second value specified in Mode 2 to smoothen a transition of the radio resource allocation for the UE between Mode 1 and Mode 2;

the processor is configured to detect a first movement of the UE from in-coverage of the cell to edge-of-coverage of the cell, and to initiate switching of the radio resource allocation for the radio interface from Mode 1 to the transition mode in response to the first movement of the UE;

the processor is configured to detect a second movement of the UE from edge-of-coverage of the cell to out-of-coverage of the cell, and to initiate switching of the radio resource allocation for the radio interface from the transition mode to Mode 2 in response to the second movement of the UE.

12. The apparatus of claim 11 wherein:

the processor is configured to detect a third movement of the UE from out-of-coverage of the cell to edge-of-coverage of the cell, and to initiate switching of the radio resource allocation for the radio interface from Mode 2 to the transition mode in response to the third movement of the UE; and the processor is configured to detect a fourth movement of the UE from edge-of-coverage of the cell to in-coverage of the cell, and to initiate switching of the radio resource allocation for the radio interface from the transition mode to Mode 1 in response to the fourth movement of the UE.

13. The apparatus of claim 11 wherein:

the processor is pre-provisioned with a resource pool that specifies the parameters for Mode 2 for allocating the radio resources of the UE for D2D communication, and specifies the second values for the parameters.

14. The apparatus of claim 11 wherein:

the processor is pre-provisioned with a resource pool that specifies the parameters for the transition mode for allocating the radio resources of the UE for the D2D communication, and specifies the third values for the parameters.

15. The apparatus of claim 14 wherein:

the cell includes a base station; and the processor is configured to receive the resource pool for the transition mode from the base station.

16. The apparatus of claim 15 wherein:

the base station comprises an eNodeB of an evolved UMTS Terrestrial Radio Access Network (e-UTRAN).

17. The apparatus of claim 11 wherein:

the processor is configured to receive a resource pool from a relay node that specifies the parameters for the transition mode for allocating the radio resources of the UE for the D2D communication, and specifies the third values for the parameters.

* * * * *